United States Patent [19]

Ohtake et al.

[11] Patent Number: 5,598,045
[45] Date of Patent: Jan. 28, 1997

[54] MINIATURE MOTOR

[75] Inventors: Takahiro Ohtake; Masahiko Kato; Toshiya Yuhi, all of Chiba-ken, Japan

[73] Assignee: Mabuchi Motor Co., Ltd., Chiba-ken, Japan

[21] Appl. No.: 292,235

[22] Filed: Aug. 17, 1994

[30] Foreign Application Priority Data

Sep. 29, 1993 [JP] Japan .................. 5-242659

[51] Int. Cl.$^6$ ................ H02K 11/00; H02K 5/24; H02K 7/00
[52] U.S. Cl. ............ 310/40 MM; 310/51; 310/71
[58] Field of Search ............. 310/40 MM, 42, 310/71, 239, 51

[56] References Cited

U.S. PATENT DOCUMENTS

| | | | |
|---|---|---|---|
| 5,010,264 | 4/1991 | Yamada et al. | 310/72 |
| 5,070,269 | 12/1991 | Tamaki et al. | 310/171 |
| 5,221,130 | 6/1993 | Satoh et al. | 310/239 |
| 5,281,876 | 1/1994 | Sato | 310/40 MM |
| 5,294,852 | 3/1994 | Straker | 310/68 C |
| 5,343,102 | 8/1994 | Mabuchi et al. | 310/71 |
| 5,382,852 | 1/1995 | Yuhi et al. | 310/40 MM |
| 5,434,460 | 7/1995 | Mabuchi et al. | 310/71 |

*Primary Examiner*—Thomas M. Dougherty
*Assistant Examiner*—Michael Wallace, Jr.
*Attorney, Agent, or Firm*—McGlew and Tuttle

[57] ABSTRACT

A miniature motor comprising a case having a permanent magnet fixedly fitted to the inner circumference thereof, a rotor having an armature iron core and a commutator, and a case cap having power-feeding brushes and input terminals in which a pair of connecting members made of an electrically conductive material are provided on the inner end face of the case cap in a state insulated from brush holders, and a pair of terminals is integrally provided on each of the connecting members and the brush holders; one terminal of the connecting member being connected to the input terminal directly or via other electrically conductive members, the other terminal of the connecting member being connected to a pig-tail wire, and a capacitor being connected across the terminals.

10 Claims, 6 Drawing Sheets

MINIATURE MOTOR

BACKGROUND OF THE INVENTION AND RELATED ART STATEMENT

This invention relates generally to a miniature motor used for audio equipment, precision instruments, automotive electrical equipment, etc., and more particularly to a miniature motor having an electrical noise preventing element and/or an over-current preventing element, and to a miniature motor in which the number of types of component members is reduced.

FIG. 1 is a longitudinal sectional front view illustrating the essential part of a miniature motor of a conventional type. In FIG. 1, numeral 1 refers to a case made of a metallic material, such as mild steel, formed into a bottomed hollow tubular shape, and having a permanent magnet 2 formed into an arc-segment shape, for example, and fixedly fitted to the inner circumferential surface of the case 1. To the case 1 fitted is a rotor comprising an armature iron core 3 facing the permanent magnet 2 and a commutator 4. Next, numeral 6 refers to a case cap made of an insulating material, such as a resin material, and fitted to an open end of the case 1. Numeral 45 refers to a brush formed into a rectangular shape in cross section, for example, and slidably fitted in a brush holder 15 provided on the inner end face of the case cap 6 in such a manner as to make sliding contact with the commutator 4.

Numeral 13 refers to a spring for forcing the brush 45 onto the commutator 4. Numeral 8 refers to an input terminal fixedly fitted after passed through the case cap 6, and electrically connected to the brush 45 via a pig-tail wire 14 on the inner end face of the case cap 6. Numerals 9 and 10 refer to bearings fixedly fitted to the bottom of the case 1 and the central part of the case cap 6, respectively, to rotatably support shafts 11 and 12 constituting the rotor 5.

With the aforementioned construction, when electric current is fed to the windings of the armature iron core 3 from the input terminals 8 and 8 via the pig-tail wires 14 and 14, the brushes 45 and 45, and the commutator 4 constituting the rotor 5, rotating force is imparted to the rotor 5 placed in a magnetic field formed by the permanent magnet 2 fixedly fitted to the inner circumferential surface of the case 1, causing the rotor 5 to rotate, thereby driving external equipment (not shown) via the shaft 11 on the output side.

In this type of miniature motor, means for preventing electrical noise by connecting a capacitor across the input terminals 8 and 8 is known. With this means, the capacitor is usually provided on the outer end face of the case cap 6 by connecting the lead wire of the capacitor across the input terminals 8 and 8 directly or via any other electrically conductive members by soldering, for example.

With a miniature motor in which a capacitor as an electrical noise preventing element is mounted on the outer end face of the case cap 6, an additional space for preventing interference with other components must be provided inside a system or equipment that uses the miniature motor as a drive unit. This construction of miniature motor therefore has a problem of impairing the miniaturization of a system or equipment in which the miniature motor is incorporated. If a choke coil, for example, is used as an electrical noise preventing element, together with the capacitor, the above problem could be further aggravated.

The above problem can be solved if the electrical noise preventing element is provided on the inner end face of the case cap 6. However, when additional electrical noise preventing elements are to be provided, the existence of a pair of brushes 45 on the inner end face of the case cap 6 makes it difficult and complicated to install lead wires for each element and the pigtail wires 14 for feeding power to the brushes 45. Furthermore, the lead wires and the pig-tail wires 14 tend to be entangled and shortcircuited.

If a special mounting member or electrically conductive member is used to facilitate the connection of these wires in a miniature motor of a construction in which a pair of input terminals 8 and 8 are not point-symmetric with respect to the motor axis, the mounting member or the electrically conductive member of different shapes and dimensions may have to be used for the positive and negative sides thereof, making it impossible to use common components. It also makes mounting operation and parts difficult to manage.

SUMMARY OF THE INVENTION

It is the first object of this invention to provide a miniature motor that can use common components.

It is the second object of this invention to provide a miniature motor that can be manufactured with simple assembly operations and at low cost.

It is the third object of this invention to provide a miniature motor that can incorporate an electrical noise preventing element, etc. while preventing the element from interfering with other component members.

DETAILED DESCRIPTION OF THE EMBODIMENTS

Figure 1:
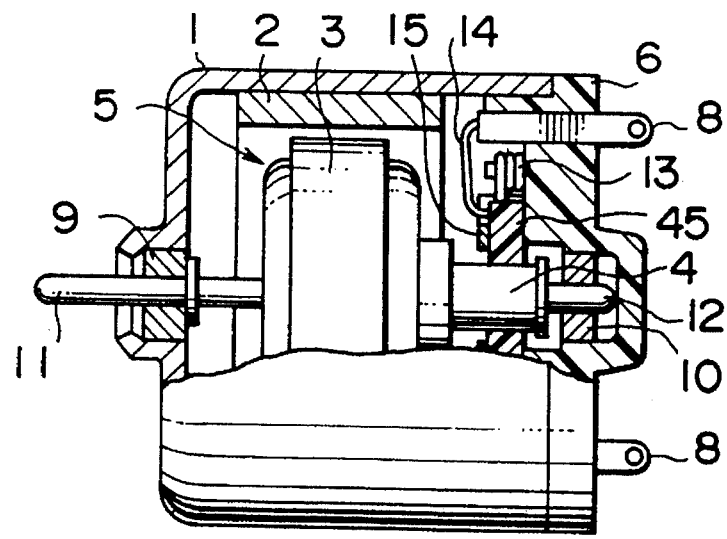
FIG. 1 is a longitudinal sectional front view illustrating the essential part of a conventional type of miniature motor.
Figure 2:
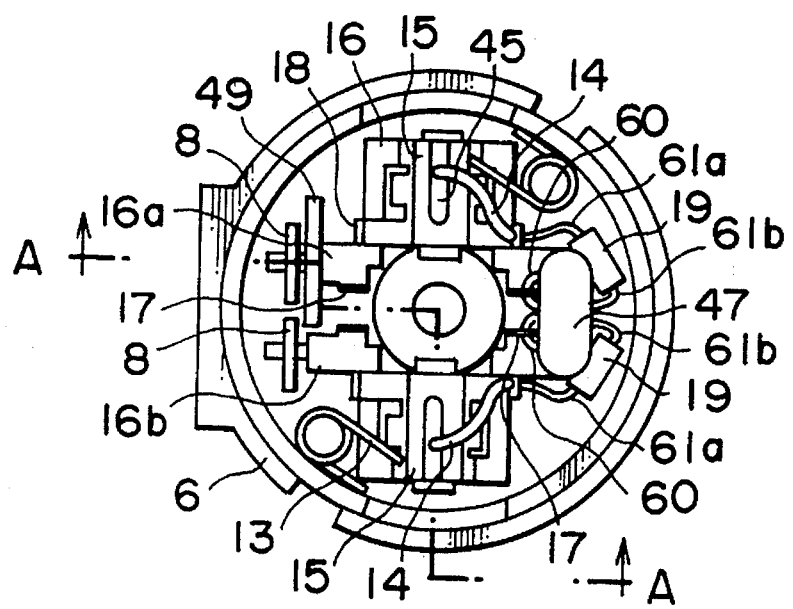
FIG. 2 is an inner end view of a case cap in the first embodiment of this invention.
Figure 3:
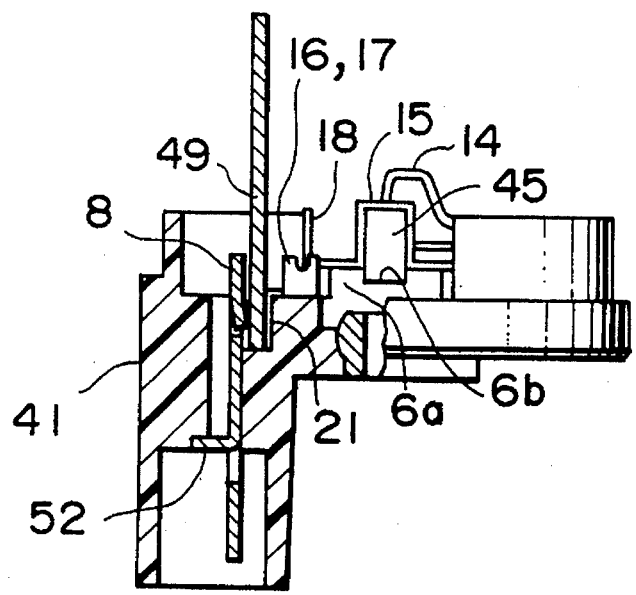
FIG. 3 is a cross-sectional side view taken along line A—A in FIG. 2.
Figure 4:
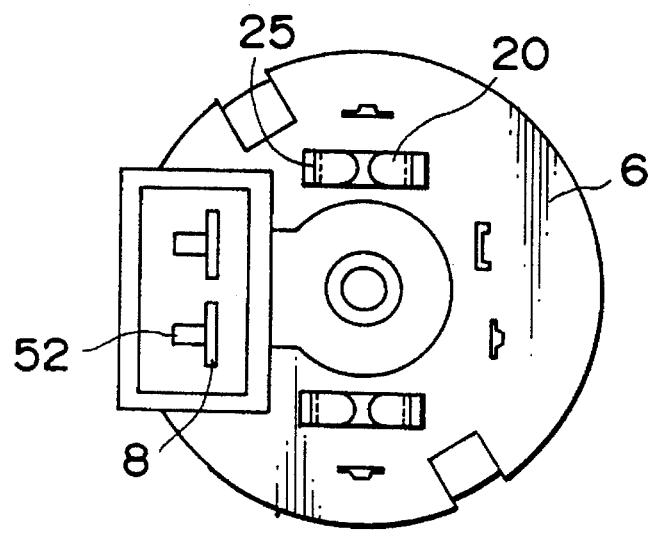
FIG. 4 is an outer end view of a case cap in the first embodiment of this invention.

FIGS. 2 and 4 are inner end and outer end views of a case cap in the first embodiment of this invention. FIG. 3 is a cross-sectional side view taken along line A—A in FIG. 2. In these figures, like parts are indicated by like numerals throughout. In FIGS. 2 through 4, a brush holder 15 is made of an electrically conductive material, formed into a substantially W shape in end-face shape, disposed on a mounting part 6a slightly protruding from the inner end face of a case cap 6, and fixedly fitted to the case cap 6 via a fixing piece 20. A brush 45 is held in the brush holder 15 in such a manner that the brush 45 can slide in a groove 6b provided on the surface of the mounting part 6a.

Numeral 16 refers to a connecting member made of an electrically conductive material, formed into a substantially U shape in planar shape and fixedly fitted to the inner end face of the case cap 6 via a fixing piece 21 in such a manner as to insulate from the brush holder 15, as will be described later. Pairs of brush terminals 18 and connecting terminals 17 are provided integrally each with the brush holder 15 and the connecting member 16, respectively, in such a manner as to protrude from the inner end face of the case cap 6.

The input terminal 8 has a stopper (not shown) and a lanced and raised lug 52, and is fixedly fitted to the case cap 6 after passed through the case cap 6. with one end thereof being protruded toward the connecting member 41, as will be described later. The input terminals 8 and 8 are connected to an open end 16a of the connecting member 16 via a positive temperature coefficient resistor 49, and directly to an open end 16b.

A capacitor 47 is connected across the terminals 17 and 17 on the other open end side of the connecting member 16 via a lead wire 60, and a lead wire 61b of the choke coil 19 is connected to the terminals 17 and 17. The other lead wire 61a of the choke coil 19 is connected to the terminal 18 of the nearby brush holder 15. The pig-tail wire 14 of the brush 45 is also connected to the terminal 18.

With the aforementioned construction, power can be fed from the input terminal 8 to the connecting member 16 directly or via the positive temperature coefficient resistor 49, or to a pair of the brushes 45 via the choke coil 19, and the capacitor 47 can be connected in parallel across the brushes 45 and 45. By doing so, the miniature motor can be prevented from being overheated, and electrical noise can be prevented.

Figure 5A:
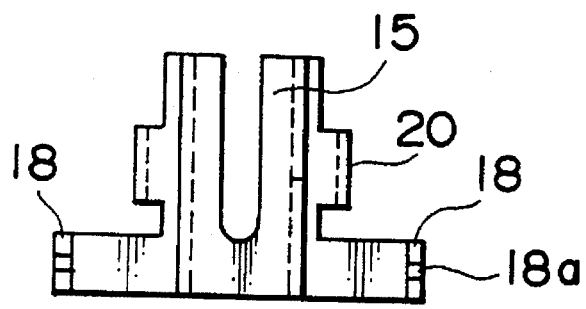
FIGS. 5A and 5B are plan and end views illustrating a brush holder 15 in FIGS. 2 through 4 respectively.
Figure 5B:
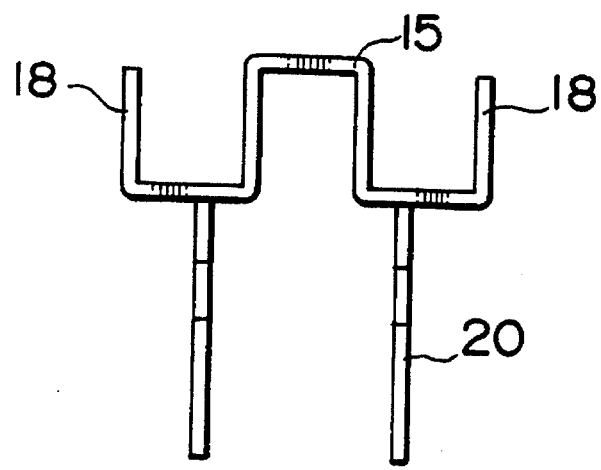

FIGS. 5A and 5B are an enlarged plan view and an enlarged end view, respectively, of the brush holder 15 shown in FIG. 4. In FIGS. 5A and 5B, the brush holder 15 is formed into a substantially T shape in planar shape and into a substantially W shape in end-face shape, and has a fixing piece 20 integrally formed therewith provided in such a manner as to protrude downward. The bush holder 15 thus formed is fixedly fitted to the case cap 6 by passing the fixing piece 20 through mounting holes 25 provided on the case cap 6 and bending the tips of the fixing pieces 20, as shown in FIG. 4. A notch 18a should preferably be provided at the end of the terminal 18.

Figure 6A:
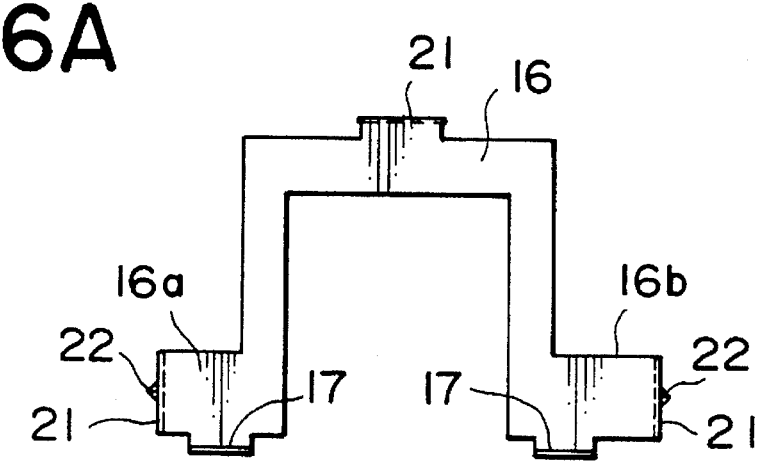
FIGS. 6A through 6C are enlarged plan, enlarged front and enlarged left-hand side view illustrating a connecting member 16 in FIGS. 2 through 4, respectively.
Figure 6B:
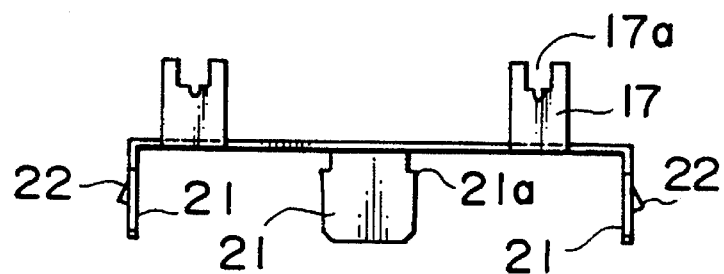
Figure 6C:
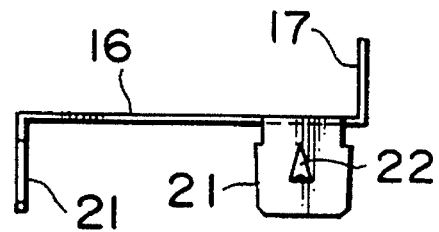

FIGS. 6A through 6C are an enlarged plan view, an enlarged front view and an enlarged left-hand side view, respectively, of the connecting member 16 shown in FIGS. 2 through 4. In FIGS. 6A through 6C, the connecting member 16 is formed into a substantially U shape in planar shape, with open ends 16a and 16b thereof being slightly extended outward. The length of the open end 16a is made slightly shorter than the other open end 16b to provide the positive temperature coefficient resistor 49 on the side of the open end 16a, as shown in FIGS. 2 and 3.

A pair of terminals 17 is provided integrally on the side edges of the open ends 16a and 16b in such a manner that the terminals 17 are bent and protruded upward, and a notch 17a is provided on the end of the terminal 17. Numeral 21 refers to fixing pieces, each provided integrally at the middle part of the U shape and at the ends of the open ends 16a and 16b of the connecting member 16 in such a manner that the fixing piece 21 is bent and protruded downward. On the side surface of the fixing piece 21 provided is a protruded part 21a whose width is made slightly larger than the width of the mounting hole provided on the case cap 6 shown in FIGS. 2 through 4. Numeral 22 refers to protrusions provided on the outside surface of the fixing pieces 21 each provided on the open ends 16a and 16b.

Figure 7A:
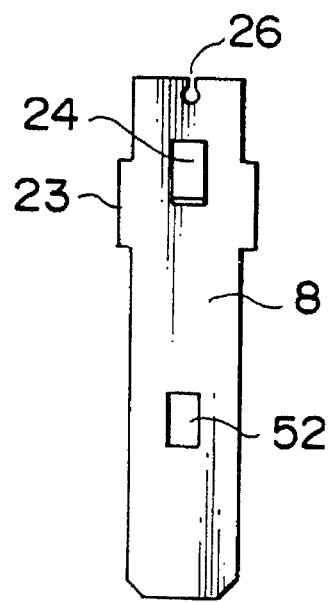
FIGS. 7A and 7B are enlarged plan and enlarged side views illustrating an input terminal 8 in FIGS. 2 through 4, respectively.
Figure 7B:
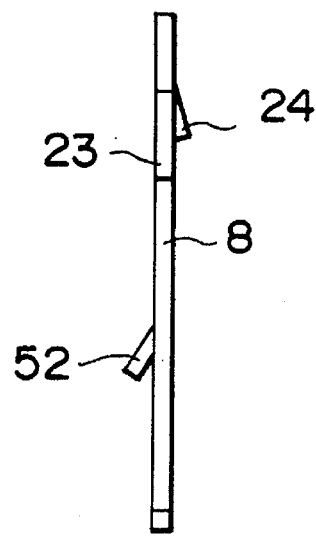

FIGS. 7A and 7B are an enlarged plan view and an enlarged side view of the input terminal 8 shown in FIGS. 2 through 4. In FIGS. 7A and 7B, numeral 23 refers to a stopper provided on the upper part of the input terminal 8 (on the side of the inner end face of the case cap 6), and having a width made larger than the middle part of the input terminal 8. The stopper 23 is for fixedly fitting the input terminal 8 on the case cap 6 by passing the input terminal 8 through the case cap 6, placing it in position and bending the lanced and raised lug 52 to right angles. Numeral 24 refers to a lanced and raised piece provided in the vicinity of the upper end of the input terminal 8.

Electrical connection among the input terminal 8, the connecting member 16 and the brush holder 15, all formed in the aforementioned manner, can be maintained by installing these members on the case cap 6 shown in FIGS. 2 through 4 and connecting the positive temperature coefficient resistor 49. That is, the input terminal 8 and the connecting member 16 are brought into positive electrical contact as the lanced and raised lug 24 makes contact with the projection 22 of the fixing piece 21. When the positive temperature coefficient resistor 49 is connected across the input terminal 8 and the connecting member 16, the lanced and raised lug 24 and the projection 22 of the fixing piece 21 make contact with the surface of the positive temperature coefficient resistor 49. In this state, even if an external force is exerted to remove the positive temperature coefficient resistor 49 in FIG. 3, the lanced and raised lug 24 provided on the input terminal 8 acts as if cutting into the surface of the positive temperature coefficient resistor 49, increasing the retaining force to prevent the positive temperature coefficient resistor 49 from coming off.

Figure 8:
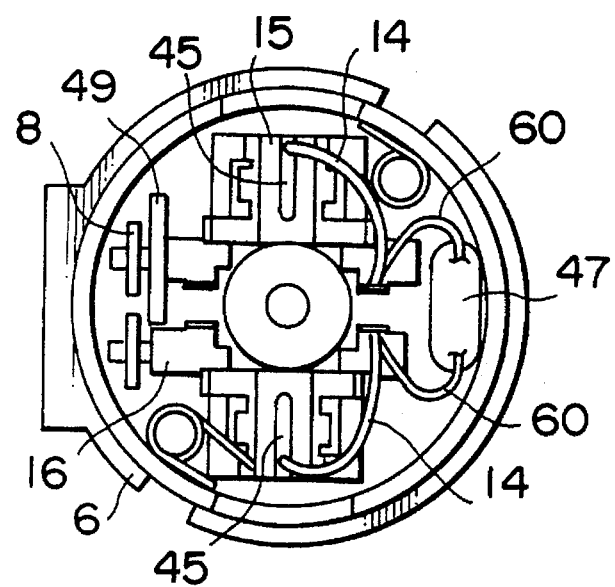
FIGS. 8 through 10 are inner end views illustrating a case cap 6 in the second through fourth embodiments of this invention, respectively.
Figure 9:
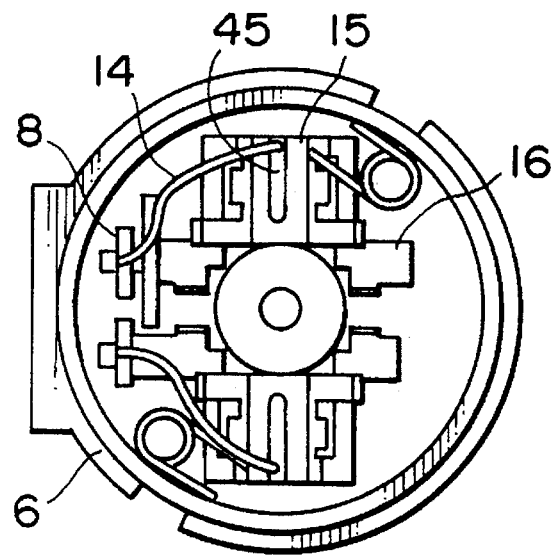

FIGS. 8 and 9 are inner end views illustrating the case cap 6 in the second and third embodiments of this invention. Like numerals indicate like parts shown in FIG. 2 throughout. In the embodiment shown in FIG. 8, lead wires 60 and 60 of the capacitor 47 and a pig-tail wire 14 of the brush 45 are connected to a pair of the terminals 17 and 17 of the connecting member 16. By connecting in this manner, electrical noise can be prevented by connecting a capacitor 47 across the brushes 45 and 45.

FIG. 9 shows an embodiment where the positive temperature coefficient resistor 49, the capacitor 47 and the choke coil 19 shown in FIG. 2 are not used, and the pig-tail wire 14 of the brush 45 is connected directly to the input terminal 8. In this case, it is desirable to provide a notch 26 on the upper end of the input terminal 8, as shown in FIGS. 7A and 7B

Figure 10:
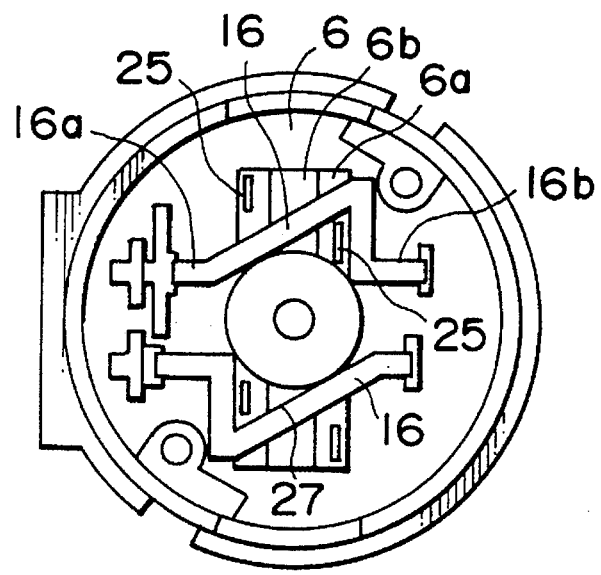

FIG. 10 is an inner end view of the case cap 6 in the fourth embodiment of this invention, in which all component members, except for the connecting member 16, are omitted. In FIG. 10, the connecting member 16 is formed into a substantially V shape in planar shape, and fitted to the inner end face of the case cap 6 via a groove 27 obliquely transversing the mounting part 6a of a brush holder (not shown). The construction of the open ends 16a and 16b of the connecting member 16 is essentially the same as that shown in FIG. 6A and 6B. Numeral 25 refers to a mounting hole for inserting the fixing piece of the brush holder. In this case, the fixing piece 20 of the brush holder 15 shown in FIGS. 5A and 5B are provided at a position where the fixing piece 20 intersects obliquely with a groove 6b.

With the aforementioned construction, the positive temperature coefficient resistor, the capacitor, the choke coil, etc. can be selectively installed, as in the case of the above embodiments. The embodiment shown in FIG. 10 can be used for a specification having little space at the trailing end of a brush holder (not shown. Refer to numeral 15 in FIG. 2.). The groove 27, which is provided in such a manner that the groove 27 obliquely transverse the groove 6b of the mounting part 6a, has no adverse effect on the sliding contact of the brushes.

In other words, if the groove 27 is provided in such a manner that the groove 27 transverse at right angles the groove 6b in which the brush slides, the end of the brush may interfere with the edge of the groove 27, adversely affecting the sliding contact of the brushes. In this embodiment, however, the brush can smoothly ride over the groove 27 because the groove 27 is provided obliquely with respect to the groove 6b.

This invention having the aforementioned construction and operation can achieve the following effects.

(1) A wide space can be secured on the inner end face of the case cap because the brush holder and the connecting member are integrally provided in an insulated state in the direction of motor axis on the inner end face of the case cap.

(2) An electrical noise preventing element can be housed on the side of the inner end face of the case cap, and as a result, when the miniature motor is installed in a piece of equipment, interference of the electrical noise preventing element with the other component member can be prevented.

(3) Since there is no need of extra electrically conductive members, and the shapes of the component members, when projected on the end face of the case cap, are point-symmetrical with respect to the motor axis, the number of component members can be reduced, and parts management and manufacturing costs can be reduced.

(4) Workability can be improved because the electrical noise preventing element can be installed at a close location.

What is claimed is:

1. A miniature motor comprising:

a case made of metallic material and having an open end;

a permanent magnet fixed to an inner circumference of said case;

a case cap fitted to an opened end of said case, said case cap having an inner face facing an inside of said case;

a rotor positioned inside said case and rotatably supported by bearings in said case cap and said case, said rotor including an armature iron core facing said magnet, said rotor also including a commutator;

a pair of electrical input terminals on said case cap;

first and second connecting members being electrically conductive and positioned on said inner face of said case cap, each of said connecting members including first and second connecting terminals, each of said first connecting terminals being connected one of directly and via an electrically conductive member to a separate one of said input terminals, said shape of said connecting members being a U-shape when projected on an end face of said case cap;

first and second brush holders mounted on said inner face of said case cap in an electrically insulated manner from said connecting members, each of said brush holders including a pair of brush terminals, said first and second connecting members having a shape encircling respective said brush holders when projected on said end face of said case cap, said shape of said brush holders and said shape of said connecting members being formed to be point-symmetrical with respect to an axis of said rotor;

first and second brushes positioned in respective said brush holders and making sliding contact with said commutator, said brushes including respective pig-tail wires, said respective pig-tail wires being electrically connected to a second terminal of respective said first and second connecting members;

a capacitor connected across two of said terminals.

2. A miniature motor comprising:

a case made of metallic material and having an open end;

a permanent magnet fixed to an inner circumference of said case a case cap fitted to an opened end of said case, said case cap having an inner face facing an inside of said case;

a rotor positioned inside said case and rotatably supported by bearings in said case cap and said case, said rotor including an armature iron core facing said magnet, said rotor also including a commutator;

a pair of electrical input terminals on said case cap;

first and second connecting members being electrically conductive and positioned on said inner face of said case cap, each of said connecting members including first and second connecting terminals, each of said first connecting terminals being connected one of directly and via an electrically conductive member to a separate one of said input terminals, said shape of said connecting members being a U-shape when projected on an end face of said case cap;

first and second brush holders mounted on said inner face of said case cap in an electrically insulated manner frown said connecting members, each of said brush holders including a pair of brush terminals, said first and second connecting members having a shape encircling respective said brush holders when projected on said end face of said case cap, said shape of said brush holders and said shape of said connecting members being formed to be point-symmetrical with respect to an axis of said rotor;

first and second brushes positioned in respective said brush holders and making sliding contact with said commutator, said brushes including respective pig-tail wires, said respective pig-tail wires being electrically connected to said one of said brush terminals of respective said first and second brush holders;

choke coils connected across terminals of said brush holders and said second connecting terminals a capacitor connected across of said second connecting terminals.

3. A motor comprising:

a case having an open end;

a case cap fitted to an opened end of said case, said case cap having an inner face facing an inside of said case;

a rotor positioned inside said case and rotatably supported by said case cap;

a pair of electrical input terminals on said case cap;

first and second connecting members being electrically conductive and positioned on said inner face of said case cap, each of said connecting members including first and second connecting terminals, each of said first connecting terminals being connected one of directly and via an electrically conductive member to a separate one of said input terminals;

first and second brush holders mounted on said inner face of said case cap in an electrically insulated manner from said connecting members, each of said brush holders including a pair of brush terminals;

first and second brushes positioned in respective said brush holders, said brushes including respective pig-tail wires, said respective pig-tail wires being electrically connected to said second connecting terminals of respective said first and second connecting members;

a capacitor electrically connected across two of said terminals.

4. A miniature motor as claimed in one of claims 1, 2 or 3 wherein a positive temperature coefficient resistor is connected across one terminal of said first connecting member and one of said input terminals.

5. A motor in accordance with claim 3, wherein:

a shape of said brush holders and a shape of said connecting members are formed to be substantially point-symmetrical with respect to an axis of said rotor.

6. A motor in accordance with claim 3, wherein:

said first and second connecting members have substantially identical shapes.

7. A motor in accordance with claim 3, wherein:

said capacitor is positioned on said inner face of said case cap.

8. A motor in accordance with claim 3, wherein:

said first and second connecting members have a shape encircling respective said brush holders when projected on an end face of said case cap;

said shape of said connecting members is a U-shape when projected on an end face of said case cap;

said shape of said brush holders and said shape of said connecting members are formed to be substantially point-symmetrical with respect to an axis of said rotor;

said capacitor is positioned on said inner face of said case cap.

9. A motor in accordance with claim 3, wherein:

said first and second connecting members have a shape encircling respective said brush holders when projected on an end face of said case cap.

10. A motor in accordance with claim 9, wherein:

said shape of said connecting members is a U-shape when projected on an end face of said case cap.

* * * * *